(12) United States Patent
Kim

(10) Patent No.: US 10,591,925 B2
(45) Date of Patent: Mar. 17, 2020

(54) CLEANER AND CONTROLLING METHOD THEREOF

(71) Applicant: LG ELECTRONICS INC., Seoul (KR)

(72) Inventor: Junghwan Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 217 days.

(21) Appl. No.: 15/705,613

(22) Filed: Sep. 15, 2017

(65) Prior Publication Data

US 2018/0113467 A1    Apr. 26, 2018

(30) Foreign Application Priority Data

Oct. 25, 2016  (KR) .................. 10-2016-0139363

(51) Int. Cl.
*G05D 1/02*      (2006.01)
*A47L 9/00*      (2006.01)
(Continued)

(52) U.S. Cl.
CPC .......... *G05D 1/0246* (2013.01); *A47L 9/009* (2013.01); *A47L 9/1683* (2013.01); *A47L 9/2826* (2013.01); *A47L 9/2852* (2013.01); *A47L 9/2857* (2013.01); *A47L 9/2873* (2013.01); *A47L 9/2884* (2013.01); *A47L 9/2894* (2013.01); *G05D 1/0088* (2013.01); *G05D 1/0274* (2013.01); *A47L 2201/04* (2013.01); *G05D 1/0255* (2013.01);
(Continued)

(58) Field of Classification Search
CPC .. G05D 1/0246; G05D 1/0088; G05D 1/0274; G05D 1/0255; G05D 1/0259; G05D 2201/0203; G05D 2201/0259; A47L 9/009; A47L 9/1683; A47L 9/2826; A47L 9/2852; A47L 9/2857; A47L 9/2873; A47L 9/2884; A47L 9/2894; A47L 2201/04

See application file for complete search history.

(56) References Cited

U.S. PATENT DOCUMENTS

2007/0156286 A1*  7/2007  Yamauchi ............ G05D 1/0038
                                                                 700/245
2012/0182392 A1*  7/2012  Kearns .................... B25J 5/007
                                                                 348/46
(Continued)

FOREIGN PATENT DOCUMENTS

CN      104027041      9/2014
CN      102551591      10/2016
(Continued)

OTHER PUBLICATIONS

International Search Report dated Nov. 20, 2017 issued in Application No. PCT/KR2017/007854.
(Continued)

*Primary Examiner* — Nicholas Kiswanto
(74) *Attorney, Agent, or Firm* — KED & Associates, LLP

(57) ABSTRACT

A cleaner for performing autonomous driving comprising: a cleaner body; a driving unit configured to move the cleaner body; a sensor configured to detect 3D coordinates information; and a controller configured to sample a part of detected 3D coordinates information based on at least one preset height, and configured to control the driving unit based on the sampled coordinates information.

20 Claims, 13 Drawing Sheets

(51) Int. Cl.
    *A47L 9/16* (2006.01)
    *A47L 9/28* (2006.01)
    *G05D 1/00* (2006.01)

(52) U.S. Cl.
    CPC ... *G05D 1/0259* (2013.01); *G05D 2201/0203* (2013.01); *G05D 2201/0215* (2013.01)

(56) References Cited

U.S. PATENT DOCUMENTS

| | | | |
|---|---|---|---|
| 2013/0204483 A1 | 8/2013 | Sung et al. | |
| 2016/0302639 A1* | 10/2016 | Lindhe | A47L 9/009 |
| 2018/0317725 A1* | 11/2018 | Lee | A47L 9/28 |
| 2019/0133400 A1* | 5/2019 | Klintemyr | A47L 9/0494 |

FOREIGN PATENT DOCUMENTS

| | | |
|---|---|---|
| KR | 10-0815570 | 3/2008 |
| KR | 10-2009-0053983 | 5/2009 |
| KR | 10-2010-0109257 | 10/2010 |
| KR | 10-2013-0090438 | 8/2013 |
| KR | 10-1490055 | 2/2015 |
| KR | 10-2015-0050159 | 5/2015 |
| KR | 10-2016-0100149 | 8/2016 |
| KR | 10-2016-0100981 | 8/2016 |

OTHER PUBLICATIONS

Korean Office Action issued in application 10-2016-0139363 dated Apr. 29, 2018.

Taiwanese Office Action dated Jul. 26, 2018 issued in TW Application No. 106129997.

Korean Notice of Allowance dated Nov. 21, 2018 issued in KR Application No. 10-2016-0139363.

\* cited by examiner

CLEANER AND CONTROLLING METHOD THEREOF

CROSS-REFERENCE TO RELATED APPLICATION(S)

Pursuant to 35 U.S.C. § 119(a), this application claims the benefit of earlier filing date and right of priority to Korean Application No. 10-2016-0139363, filed on Oct. 25, 2016 the contents of which is incorporated by reference herein in its entirety.

BACKGROUND

1. Field

The present disclosure relates to a cleaner and a controlling method thereof, and more particularly, to a cleaner capable of recognizing an obstacle and performing an autonomous driving, and a method for controlling the same.

2. Background

Generally, a robot has been developed for an industrial use, and has managed some parts of factory automation. As the robot is applied to various fields recently, not only medical robots and space robots, but also home robots are being developed.

A representative of the home robot is a robot cleaner, a kind of home electronic appliance capable of performing a cleaning operation by sucking dust or foreign materials while autonomously moving on a predetermined region. Such robot cleaner is provided with a chargeable battery, and is provided with an obstacle sensor for avoiding an obstacle while autonomously moving.

Recently, research is actively ongoing in order to utilize a robot cleaner in various fields such as a health care, a smart home and a remote control, beyond the general concept that a robot cleaner performs a cleaning while autonomously moving on a cleaning region. In a case where the robot cleaner performs an autonomous driving within a cleaning region, the robot cleaner may collide with various obstacles which exist in the cleaning region. In order to avoid such obstacles while the robot cleaner is performing an autonomous driving and a cleaning operation, required is an apparatus or a method of detecting obstacle-related information.

More specifically, the conventional robot cleaner is provided with only an infrared ray sensor, an ultrasonic sensor, a radio frequency (RF) sensor, an optical sensor, or a camera sensor which acquires two-dimensional (2D) images, in order to detect obstacle-related information. Accordingly, the conventional robot cleaner has a difficulty in acquiring precise obstacle information. Especially, the conventional robot cleaner detects an obstacle based on 2D image information acquired by a 2D camera sensor. However, it is difficult to precisely detect a distance between an obstacle and a cleaner body of the robot cleaner, a stereoscopic three-dimensional (3D) shape of the obstacle, etc., based on such 2D image information.

Accordingly, even if there is, on a driving path, an obstacle through which the conventional robot cleaner can pass, the conventional robot cleaner had to correct the driving path in order to avoid the obstacle. Further, the conventional robot cleaner extracts feature points from 2D image information, in order to detect obstacle information. In this case, if it is difficult to extract the feature points from the 2D image information, precision (accuracy) of detected obstacle information is significantly lowered. In order to solve such problems, a robot cleaner having a 3D camera sensor may be used.

As a technique related to such a robot cleaner, an obstacle map is generated based on a 3D map of red, green, blue-depth (RGB-D) camera, in Korean Registered Patent Publication No. 10-1490055 (published on Feb. 6, 2015). However, since a 3D camera sensor acquires a larger amount of data than a 2D camera sensor, a robot cleaner using such a 3D camera sensor may have its computation amount increased excessively. If the computation amount of the robot cleaner is excessively increased, it takes a lot of time to detect obstacle information and to determine a corresponding driving algorithm. This may allow the robot cleaner not to immediately react with a peripheral obstacle. The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
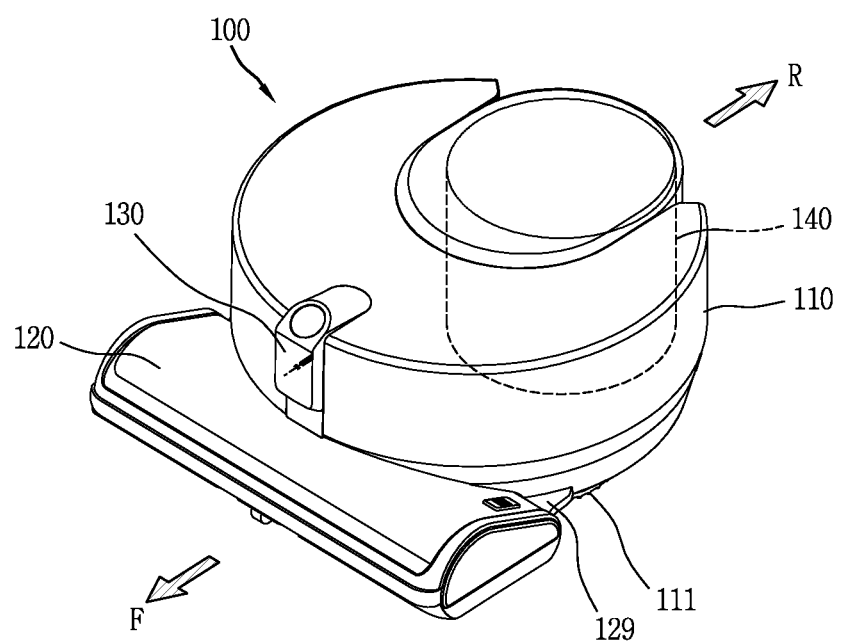
FIG. 1 is a perspective view showing an example of a robot cleaner according to the present disclosure.
Figure 2:
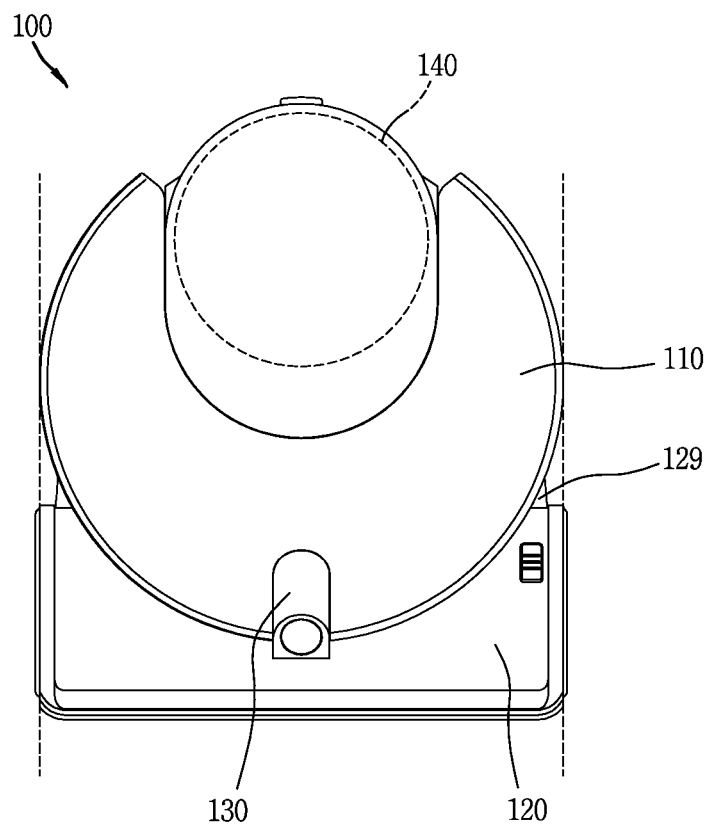
FIG. 2 is a planar view of the robot cleaner shown in FIG. 1.
Figure 3:
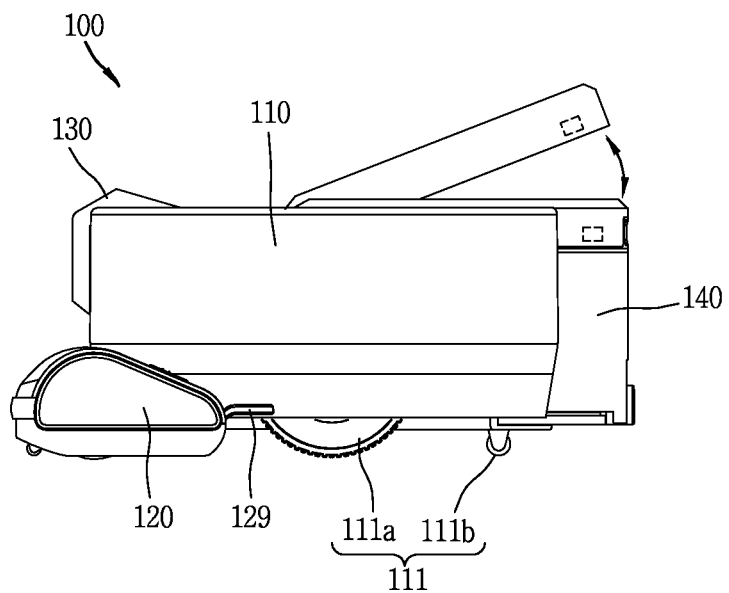
FIG. 3 is a lateral view of the robot cleaner shown in FIG. 1.

Description will now be given in detail of a cleaner and a controlling method thereof, with reference to the accompanying drawings. FIG. 1 is a perspective view showing an example of a robot cleaner 100 according to the present disclosure. FIG. 2 is a planar view of the robot cleaner 100 shown in FIG. 1. And FIG. 3 is a lateral view of the robot cleaner 100 shown in FIG. 1. In the specification, a moving robot, a robot cleaner, and a cleaner which performs an autonomous driving may have the same meaning.

Referring to FIGS. 1 to 3, the robot cleaner 100 performs a function to clean a floor by sucking dust (including foreign materials) on the floor or by mopping the floor, while autonomously moving on a predetermined region. The robot cleaner 100 includes a cleaner body 110, a suction unit 120, a sensing unit 130, and a dust container 140.

The cleaner body 110 is provided with a controller (not shown) for controlling the robot cleaner 100, and a wheel unit 11 for driving the robot cleaner 100. The robot cleaner 100 may be moved or rotated by the wheel unit 111, back and forth and right and left. The wheel unit 111 includes main wheels 111a and a sub wheel 111b.

The main wheels 111a are provided at both sides of the cleaner body 110, and are rotatable in one direction or another direction according to a control signal of a controller. The main wheels 111a may be driven independently. For instance, each of the main wheels 111a may be driven by a different motor. The sub wheel 111b is configured to support the cleaner body 110 together with the main wheels 111a, and to assist a driving of the robot cleaner 100 by the main wheels 111a. The sub wheel 111b may be also provided at the suction unit 120 to be explained later.

As aforementioned, the robot cleaner 100 autonomously moves on a floor as the controller controls a driving of the wheel unit 111. A battery (not shown) for supplying a power to the robot cleaner 100 is mounted to the cleaner body 110. The battery is formed to be chargeable, and may be detachably formed at a bottom surface of the cleaner body 110.

The suction unit 120 is provided to protrude from one side of the cleaner body 110, and is configured to suck dust-included air. The one side may be a side where the cleaner body 110 moves in a forward direction (F), i.e., a front side of the cleaner body 110. In the drawings, the suction unit 120 is protruded from one side of the cleaner body 110, towards a front side and right and left sides. More specifically, a front end of the suction unit 120 is provided at a position forward-spaced from one side of the cleaner body 110, and right and left ends of the suction unit 120 are provided at positions spaced from one side of the cleaner body 110 towards right and left sides.

The cleaner body 110 is formed to have a circular shape, and both sides of a rear end of the suction unit 120 are protruded from the cleaner body 110 towards right and left sides. As a result, an empty space (a gap) may be formed between the cleaner body 110 and the suction unit 120. The empty space, a space between right and left ends of the cleaner body 110 and right and left ends of the suction unit 120, is recessed towards the inside of the robot cleaner 100.

If an obstacle is positioned at the empty space, the robot cleaner 100 may not move due to the obstacle. In order to solve such a problem, a cover member 129 may be provided to cover at least part of the empty space. The cover member 129 may be provided at the cleaner body 110 or the suction unit 120. In this embodiment, the cover members 129 protrude from both sides of a rear end of the suction unit 120, thereby covering an outer circumferential surface of the cleaner body 110.

The cover member 129 is provided to fill at least part of the empty space between the cleaner body 110 and the suction unit 120. This may prevent an obstacle from being positioned in the empty space, or may allow the robot cleaner to be easily separated from an obstacle provided in the empty space.

The cover member 129 protruded from the suction unit 120 may be supported on an outer circumferential surface of the cleaner body 110. If the cover member 129 protrudes from the cleaner body 110, the cover member 129 may be supported on a rear surface of the suction unit 120. Under such a structure, when the suction unit 120 has an impact by colliding with an obstacle, the impact may be distributed as part of the impact is transferred to the cleaner body 110.

The suction unit 120 may be detachably coupled to the cleaner body 110. Once the suction unit 120 is separated from the cleaner body 110, a mop module (not shown) may be detachably coupled to the cleaner body 110 by replacing the separated suction unit 120. Thus, a user may mount the suction unit 120 to the cleaner body 110 in case of removing dust on a floor, and may mount the mop module to the cleaner body 110 in case of mopping a floor.

When the suction unit 120 is mounted to the cleaner body 110, the mounting may be guided by the aforementioned cover member 129. That is, as the cover member 129 is provided to cover an outer circumferential surface of the cleaner body 110, a relative position of the suction unit 120 with respect to the cleaner body 110 may be determined.

The sensing unit 130 is provided at the cleaner body 110. As shown, the sensing unit 130 may be provided at one side of the cleaner body 110 where the suction unit 120 is positioned, i.e., a front side of the cleaner body 110. The sensing unit 130 may be provided to overlap the suction unit 120 in upper and lower directions of the cleaner body 110. The sensing unit 130 is provided above the suction unit 120, and is configured to sense an obstacle or a terrain feature provided at a front side, for prevention of collision of the suction unit 120 provided at a foremost side of the robot cleaner 100, with the obstacle. The sensing unit 130 is configured to additionally perform other sensing functions rather than such a sensing function. This will be explained later in more detail.

A dust container accommodating portion is provided at the cleaner body 110, and the dust container 140 for collecting dust included in sucked air in a separated manner is detachably coupled to the dust container accommodating portion. As shown, the dust container accommodating portion may be formed at another side of the cleaner body 110, i.e., a rear side of the cleaner body 110. One part of the dust container 140 may be accommodated in the dust container accommodating portion, and another part thereof may protrude towards a rear side of the cleaner body 110 (i.e., in a reverse direction (R) to the forward direction (F)).

The dust container 140 is provided with an inlet through which dust-included air is introduced, and an outlet through which dust-separated air is discharged out. When the dust container 140 is mounted to the dust container accommodating portion, the inlet and the outlet are communicated with a first opening and a second opening formed on an inner side wall of the dust container accommodating portion, respectively.

An air suction passage inside the cleaner body 110 corresponds to a passage from an inlet (not shown) communicated with a communication portion to the first opening, and an air discharge passage corresponds to a passage from the second opening to an outlet. With such a configuration, dust-included air introduced through the suction unit 120 is introduced into the dust container 140 via the air suction passage inside the cleaner body 110, and is separated from the dust while passing through a filter of the dust container 140 or a cyclone. The dust is collected in the dust container 140, and the air is discharged from the dust container 140. Then, the air passes through the air discharge passage inside the cleaner body 110, and is finally discharged out through the outlet.

Figure 4:
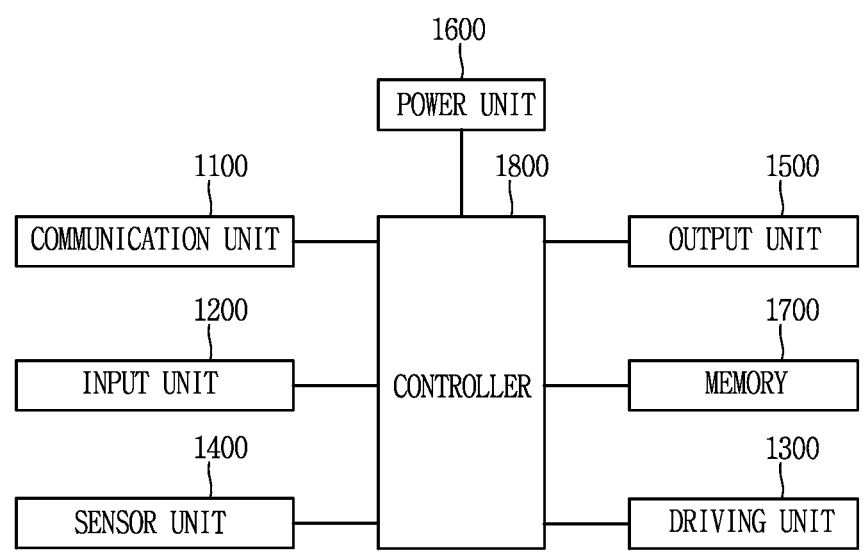
FIG. 4 is a block diagram showing components of a robot leaner according to an embodiment of the present disclosure.

FIG. 4 shows components of the robot cleaner 100 according to an embodiment of the present disclosure. The robot cleaner 100 (or the moving robot) according to an embodiment of the present disclosure may include at least one of a communication unit (or transceiver) 1100, an input unit (or device) 1200, a driving unit (or motor) 1300, a sensing unit (or sensor) 1400, an output unit (or device) 1500, a power unit (or battery) 1600, a memory 1700 and a controller (or processor) 1800, or a combination thereof. The components shown in FIG. 4 are not absolutely necessary, and fewer or more components of the robot cleaner may be implemented. Hereinafter, each of the components will be explained.

The power unit 1600 is provided with a battery chargeable by an external commercial power, and supplies a power to the robot cleaner. The power unit 1600 may supply a driving power to each of the components of the robot cleaner, thereby supplying an operation power required for the robot cleaner to move or to perform a specific function.

Here, the controller 1800 may sense a remaining amount of power of the battery. If the remaining amount of the power is small, the controller 1800 may control the robot cleaner to move to a charging plate connected to an external commercial power, in order to charge the battery by receiving a charging current from the charging plate. The battery may be connected to a battery sensing unit, and the remaining amount of the power and a charging state of the battery may be transmitted to the controller 1800. The output unit 1500 may display the remaining amount of the power of the battery, on a screen, under control of the controller.

The battery may be positioned at a part below a central region of the robot cleaner, or may be positioned at one of right and left sides of the robot cleaner. In the latter case, the robot cleaner may be further provided with a balance weight to prevent a concentrated (biased) state of the battery.

The driving unit 1300 is provided with a motor, and may rotate or move the cleaner body by rotating the right and left main wheels in two directions, by driving the motor. The driving unit 1300 may move the cleaner body of the robot cleaner back and forth and right and left, or in a curved manner, or on the spot (in place).

The input unit 1200 receives various control commands with respect to the robot cleaner, from a user. The input unit 1200 may include one or more buttons. For instance, the input unit 1200 may include an ok button, a setting button, etc. The ok button is used to receive, from a user, a command instructing check of sensing information, obstacle information, position information and map information. And the setting button is used to receive, from a user, a command to set the plurality of information. Further, the input unit 1200 may include an input resetting button for canceling a previous user input and receiving a user input again, a deletion button for deleting a preset user input, a button for setting or changing an operation mode, a button for receiving a command to return to a charging plate, etc. Further, the input unit 1200 may be installed at an upper part of the robot cleaner, in the form of a hard key, a soft key, a touch pad, etc. And the input unit 1200 may be implemented in the form of a touch screen together with the output unit 1500.

The output unit 1500 may be installed at an upper part of the robot cleaner. The installation position and the installation form may be changed. For instance, the output unit 1500 may display, on a screen, a battery state, a driving method, etc.

The output unit 1500 may output information on an internal state of the robot cleaner detected by the sensing unit 1400, e.g., a current state of each component included in the robot cleaner. Further, the output unit 1500 may display, on the screen, information on an external state of the robot cleaner detected by the sensing unit 1400, i.e., obstacle information, position information, map information, etc. The output unit 1500 may be implemented as one of a light emitting diode (LED), a liquid crystal display (LCD) device, a plasma display panel, and an organic light emitting diode (OLED).

The output unit 1500 may further include an audio output means for audibly outputting operation procedures or an operation result of the robot cleaner performed by the controller 1800. For instance, the output unit 1500 may output an alarm sound to the outside, according to an alarm signal generated by the controller 1800. Here, the audio output means may be a sound outputting means such as a beeper and a speaker, and the output unit 1500 may output a sound to the outside through the audio output means, by using audio data or message data having a predetermined pattern and stored in the memory 1700.

Thus, the robot cleaner according to an embodiment of the present disclosure may output environment information about a running region, on the screen, or in the form of a sound, through the output unit 1500. According to another embodiment of the present disclosure, the robot cleaner may transmit map information or environment information to a terminal device through the communication unit 1100, such that the terminal device may output a screen or a sound to be output through the output unit 1500.

The communication unit 1100 is connected to the terminal device and/or another device positioned within a specific area (which will be also referred to as "a home appliance" in this specification), by one of a wired communication method, a wireless communication method and a satellite communication method, for transception (transmission and reception) of a signal and data.

The communication unit 1100 may transmit and receive data to/from another device positioned within a specific area. Said another device may be any device which can transceive data in a connected state to a network. For instance, said another device may be an air conditioner, a heating device, an air purifier, an electric lamp, a television, a vehicle, etc. Alternatively, said another device may be a device for controlling a door, a window, a faucet valve (a tap valve), a gas valve, etc. Alternatively, said another device may be a sensor for sensing a temperature, a humidity, an air pressure, a gas, etc.

The memory 1700 stores therein a control program for controlling or driving the robot cleaner, and related data. The memory 1700 may also store therein audio information, image information, obstacle information, position information, map information, etc. The memory 1700 may also store therein information related to a driving pattern.

As the memory 1700, a non-volatile memory is mainly used. The non-volatile memory (NVM, NVRAM) is a storage device capable of continuously maintaining information stored therein even when a power is not supplied thereto. For instance, the non-volatile memory may be a ROM, a flash memory, a magnetic computer memory (e.g., a hard disc, a diskette drive, or a magnetic tape), an optical disc drive, a magnetic RAM, PRAM, etc.

The sensing unit 1400 may include at least one of an external signal sensor, a front side sensor, a cliff sensor, a lower camera sensor, an upper camera sensor, and a 3D camera sensor. The external signal sensor may sense an external signal of the robot cleaner. For instance, the external signal sensor may be an infrared ray sensor, an ultrasonic sensor, a radio frequency (RF) sensor, etc.

The robot cleaner may check a position and a direction of a charging plate by receiving a guide signal generated from the charging plate, by using the external signal sensor. Here, the charging plate may generate a guide signal indicating a direction and a distance such that the robot cleaner can return to the charging plate. That is, the robot cleaner may determine a current position by receiving a signal generated from the charging plate, and may return to the charging plate by setting a moving direction.

The front side sensor may be installed on a front side of the robot cleaner, more specifically, on a lateral outer circumferential surface of the robot cleaner, at preset intervals therebetween. The front side sensor, provided on at least one side surface of the robot cleaner and configured to sense a front obstacle, may sense an object which exists in a moving direction of the robot cleaner, especially, an obstacle. Then, the front side sensor may transmit detection information to the controller 1800. That is, the front sensor may sense a protruding object which exists on a driving path of the robot cleaner, a home object, furniture, a wall surface, a wall edge, etc., and may transmit related information to the controller 1800.

For instance, the front side sensor may be an infrared ray sensor, an ultrasonic sensor, a radio frequency (RF) sensor, a geomagnetic sensor, etc. As the front side sensor, the robot cleaner may use the same type of sensors, or two or more types of sensors if necessary.

For instance, an ultrasonic sensor may be mainly used to detect an obstacle which is provided at a remote distance. The ultrasonic sensor is provided with a signal transmitting portion and a signal receiving portion, and the controller 1800 may determine whether an obstacle exists or not by determining whether an ultrasonic wave emitted from the signal transmitting portion is received by the signal receiving portion after being reflected from the obstacle, etc. Then, the controller 1800 may calculate a distance to the obstacle, based on an ultrasonic wave emitting time and an ultrasonic wave receiving time.

And the controller 1800 may detect information on a size of an obstacle, by comparing ultrasonic waves emitted from the signal generating portion, with ultrasonic waves received by the signal receiving portion. For instance, the controller 1800 may determine that an obstacle has a large size when a large amount of ultrasonic waves are received by the signal receiving portion.

In an embodiment, a plurality of (e.g., 5) ultrasonic sensors may be installed on front side surfaces of the robot cleaner, along an outer circumferential surface. Preferably, the ultrasonic sensors may be installed on a front surface of the robot cleaner such that signal transmitting portions and signal receiving portions are alternate with each other.

That is, the signal transmitting portions may be arranged on right and left sides based on a central region of a front surface of the cleaner body, in a spaced manner. And one or at least two signal transmitting portions may be arranged between the signal receiving portions, thereby forming a receiving region of ultrasonic waves reflected from an obstacle, etc. This may reduce the number of sensors, and may expand a signal receiving region. In order to prevent a crosstalk phenomenon, an ultrasonic wave transmitting angle may be maintained within a range not to influence on different signals. And the signal receiving portions may be set to have different reception sensitivities.

The ultrasonic sensor may be installed so as to be upward by a predetermined angle, such that ultrasonic waves generated from the ultrasonic sensor may be upward output. In this case, a shielding member for preventing downward emission of ultrasonic waves may be further included.

As aforementioned, as the front side sensor, two or more types of sensors may be used. Accordingly, the front side sensor may be implemented as one of an infrared ray sensor, an ultrasonic sensor, an RF sensor, etc. For instance, the front side sensor may include an infrared ray sensor, as another type of sensor rather than the ultrasonic sensor. The infrared ray sensor may be installed on an outer circumferential surface of the robot cleaner together with the ultrasonic sensor. The infrared ray sensor may detect an obstacle which exists at a front side or on a side surface of the robot cleaner, and may transmit obstacle information to the controller 1800. That is, the infrared ray sensor may sense a protruding object which exists on a driving path of the robot cleaner, a home object, furniture, a wall surface, a wall edge, etc., and may transmit related information to the controller 1800. Accordingly, the cleaner body of the robot cleaner may move within a specific area without colliding with an obstacle.

The cliff sensor may sense an obstacle on a floor which supports the cleaner body of the robot cleaner, by using various types of optical sensors. That is, the cliff sensor is installed on a rear surface of the robot cleaner on a floor, and may be installed on a different position according to a type of the robot cleaner. The cliff sensor, configured to sense an obstacle on a floor by being positioned on a rear surface of the robot cleaner, may be an infrared ray sensor having a signal transmitting portion and a signal receiving portion like the obstacle sensor. Alternatively, the cliff sensor may be an ultrasonic sensor, an RF sensor, a Position Sensitive Detector (PSD) sensor, etc. For instance, one cliff sensor may be installed at a front side of the robot cleaner, and two cliff sensors may be installed at a rear side of the robot cleaner.

For instance, the cliff sensor may be a PSD sensor, and may be implemented as different types of sensors. The PSD sensor senses a short wavelength distance of incident light by using one p-n junction using a surface resistance of a semiconductor. The PSD sensor includes a primary PSD sensor for sensing light only in one axis direction, and a secondary PSD sensor for sensing a light position on a plane. Both of the primary PSD sensor and the secondary PSD sensor may have a pin photo diode structure. The PSD sensor, a type of infrared ray sensor, measures a distance by transmitting an infrared ray and then by measuring an angle of the infrared ray which returns after being reflected from an obstacle. That is, the PSD sensor calculates a distance to an obstacle by using a triangulation method.

The PSD sensor is provided with a light emitting portion for emitting an infrared ray to an obstacle, and a light receiving portion for receiving the infrared ray which returns by being reflected from the obstacle. Generally, the PSD sensor is implemented in the form of a module. In case of sensing an obstacle by using the PSD sensor, a stable measurement value may be obtained regardless of a reflectivity and a color of the obstacle.

The controller 1800 may sense a cliff and may analyze a depth, by measuring an infrared ray angle between a light emitting signal of an infrared ray emitted towards a floor surface by the cliff sensor, and a reflection signal received after being reflected from an obstacle.

The controller 1800 may determine whether the robot cleaner can pass through a cliff based on a floor surface state of the cliff sensed by the cliff sensor, and may decide whether to pass through the cliff according to a result of the determination. For instance, the controller 1800 may determine whether a cliff exists or not and a depth of the cliff, through the cliff sensor. Then, only when a reflection signal is sensed through the cliff sensor, the controller 1800 controls the robot cleaner to pass through the cliff. As another example, the controller 1800 may determine a lifted state of the robot cleaner by using the cliff sensor.

The lower camera sensor is provided on a rear surface of the robot cleaner, and obtains image information about a floor surface (or a surface to be cleaned) while the robot cleaner is moving. The lower camera sensor is also referred to as an optical flow sensor. The lower camera sensor generates a predetermined type of image data by converting an image related to a floor surface (or a surface to be cleaned), the image input from an image sensor provided in the lower camera sensor. The generated image data may be stored in the memory 1700.

One or more light sources may be installed near an image sensor. The one or more light sources irradiate light onto a predetermined region of a floor surface captured by the image sensor. That is, in a case where the robot cleaner moves within a specific area along a floor surface, if the floor surface is flat, a distance between the image sensor and the floor surface is constantly maintained. On the other hand, in a case where the robot cleaner moves along a floor surface having a non-uniform surface, the image sensor becomes far from the floor surface by more than a predetermined distance, due to a concavo-convex portion and an obstacle on the floor surface. Here, the controller 1800 may control the one or more light sources to control the amount of light to be irradiated. The light source may be a light emitting device which can control an optical amount, e.g., a light emitting diode (LED).

The controller 1800 may detect a position of the robot cleaner regardless of a sliding of the robot cleaner, by using the lower camera sensor. The controller 1800 may calculate a moving distance and a moving direction by analyzing image data captured by the lower camera sensor according to time, thereby calculating a position of the robot cleaner. The controller 1800 may compensate for a sliding of the robot cleaner on a position calculated by another means, based on image information on a lower part of the robot cleaner captured by the lower camera sensor.

The upper camera sensor may be installed to be towards an upper side or a front side of the robot cleaner, thereby capturing the periphery of the robot cleaner. If the robot cleaner is provided with a plurality of upper camera sensors, the upper camera sensors may be provided on an upper part or a side surface of the robot cleaner with a predetermined distance or a predetermined angle therebetween.

Figure 5:
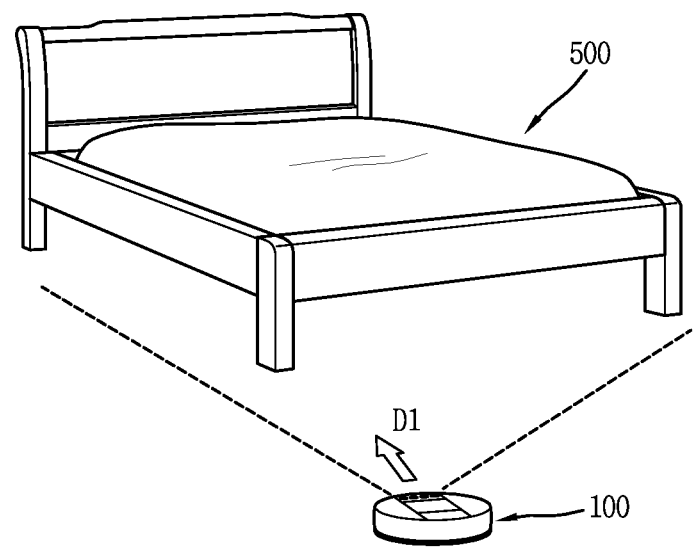
FIG. 5 is a conceptual view showing a method of driving a robot cleaner according to an embodiment of the present disclosure.

FIG. 5 shows an embodiment illustrating an operation method of the robot cleaner 100, in a case where an obstacle 500 exists on a driving path of the robot cleaner 100 shown in FIGS. 1 to 3. A 3D camera (not shown) of the robot cleaner 100 may detect 3D coordinates information related to an obstacle 500 positioned on a driving path (D1). For instance, the 3D camera may detect 3D coordinates information corresponding to an object which exists within a predetermined distance from a cleaner body of the robot cleaner 100.

The controller 1800 of the robot cleaner 100 may determine whether the robot cleaner 100 can pass through the obstacle 500 or not, based on the 3D coordinates information detected by the 3D camera. More specifically, the controller 1800 may determine whether the robot cleaner 100 can pass through the obstacle 500 or not without changing the driving path (D1), based on the 3D coordinates information. That is, the controller 1800 may determine whether the cleaner body of the robot cleaner 100 can pass through a space formed between the obstacle 500 and a floor, based on the 3D coordinates information.

As shown in FIG. 5, if the obstacle 500 positioned on the driving path (D1) is a bed, a space may be formed between the bed and a floor. The controller 1800 may detect information related to the space based on 3D coordinates information, and may determine whether the cleaner body of the robot cleaner 100 can pass through the space. Especially, the controller 1800 may sample a part of 3D coordinates information based on a plurality of altitude values, and may detect information related to the obstacle 500 based on a result of the sampling.

The conventional robot cleaner, which detects information related to an obstacle positioned at a front side of the cleaner body by using an ultrasonic sensor, cannot detect whether there is a space through which the robot cleaner can pass, below the obstacle 500 shown in FIG. 5. Further, the conventional robot cleaner does not detect information corresponding to a plurality of altitudes with respect to an obstacle positioned at a front side thereof, even if a plurality of sensors rather than the ultrasonic sensor are used. Accordingly, the conventional robot cleaner cannot detect whether there is a space through which the robot cleaner can pass, below the obstacle 500 shown in FIG. 5.

That is, the conventional robot cleaner detects only whether there is an obstacle per single lattice included in a lattice map (grid map) of a cleaning region, and does not detect whether there is an obstacle according to an altitude of the single lattice. As a result, if the conventional robot cleaner faces the obstacle 500 shown in FIG. 5, it changes a driving path in order to avoid the obstacle 500, even if it can pass through the obstacle 500.

Figure 6:
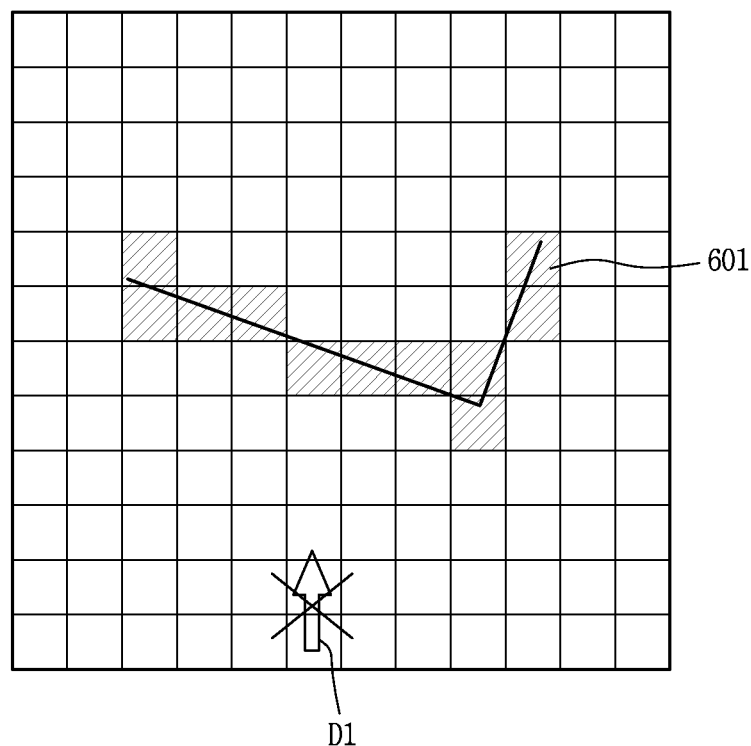
FIG. 6 is a conceptual view showing a cleaning map generated from a robot cleaner in accordance with the conventional art.

FIG. 6 illustrates an embodiment related to map information detected by the conventional robot cleaner and a driving of the robot cleaner, in a case where the obstacle 500 shown in FIG. 5 exists on a driving path (D1) of the conventional robot cleaner. As shown in FIG. 6, the conventional robot cleaner detects a representative value 601 related to an obstacle, per single lattice corresponding to a floor. As a result, if the conventional robot cleaner faces the obstacle 500 shown in FIG. 5, it may detect only whether an obstacle exists on a part of lattices included in a cleaning map. Accordingly, the conventional robot cleaner changes the driving path (D1) in order to avoid the obstacle 500.

Figure 7A:
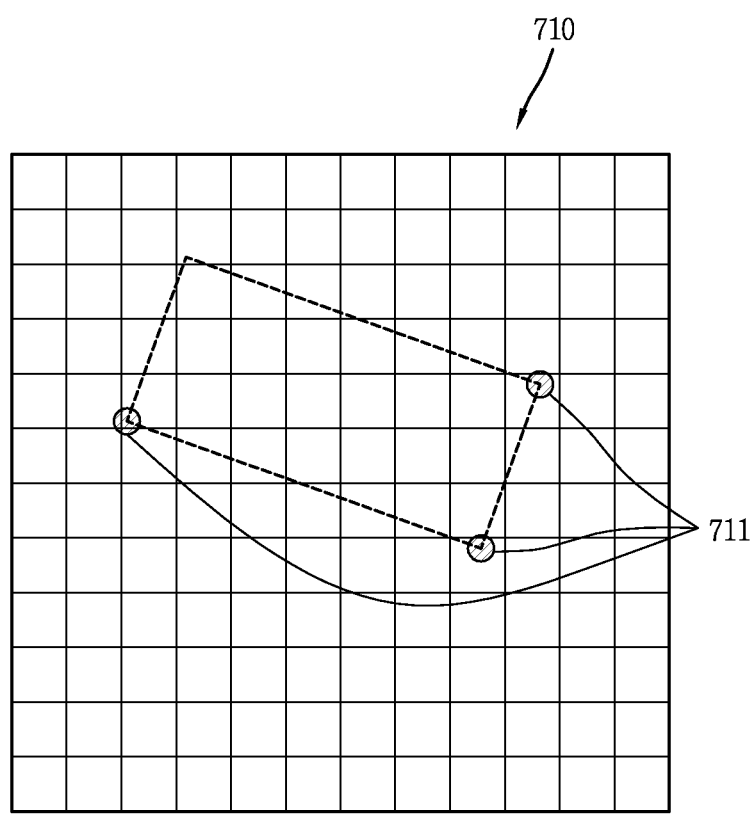
FIGS. 7A to 7C are conceptual views each showing a cleaning map generated from a robot cleaner according to the present disclosure.
Figure 7B:
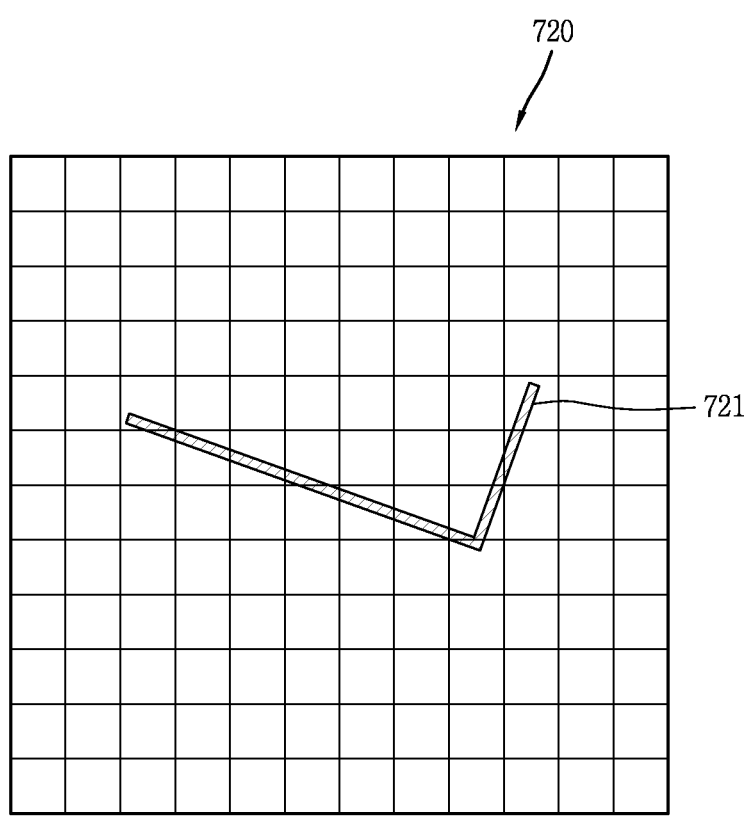
Figure 7C:
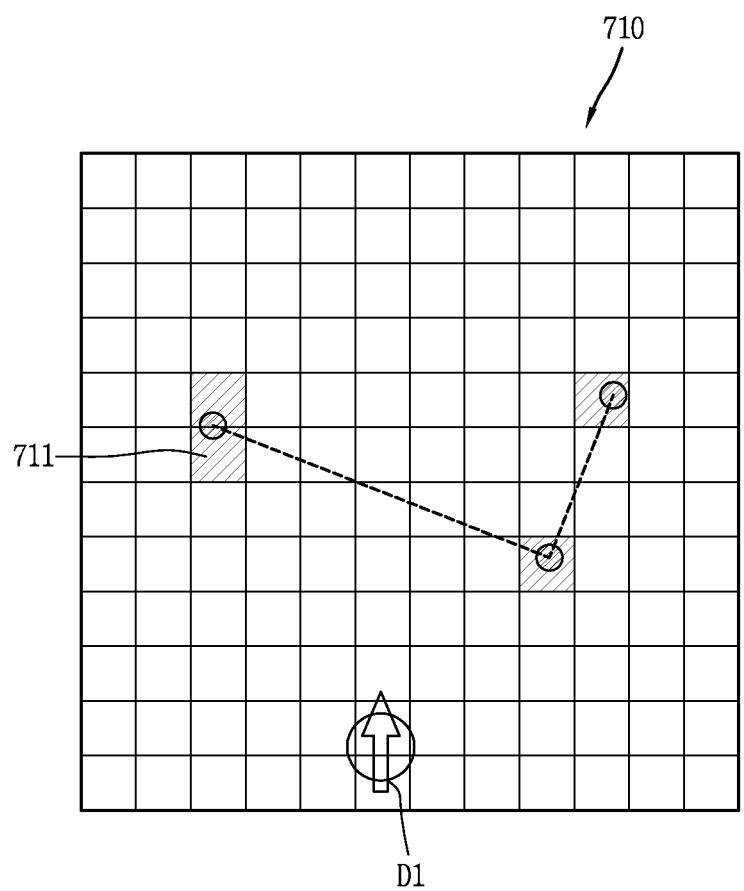

FIGS. 7A to 7C show an embodiment related to map information detected by the robot cleaner 100 of the present disclosure, and related to a driving of the robot cleaner 100, in a case where the obstacle 500 shown in FIG. 5 exists on the driving path (D1) of the robot cleaner 100 according to the present disclosure.

Referring to FIGS. 7A and 7B, the controller 1800 may extract 3D coordinates information corresponding to a preset height value, among 3D coordinates information acquired by the 3D camera. And the controller 1800 may generate the same number of cleaning maps as the number of preset height values.

As shown in FIG. 7A, the controller 1800 may generate a first map 710 corresponding to a first height, based on coordinates information corresponding to the first height among detected 3D coordinates information. As shown in FIG. 7B, the controller 1800 may generate a second map 720 corresponding to a second height, based on coordinates information corresponding to the second height among detected 3D coordinates information.

Figure 8:
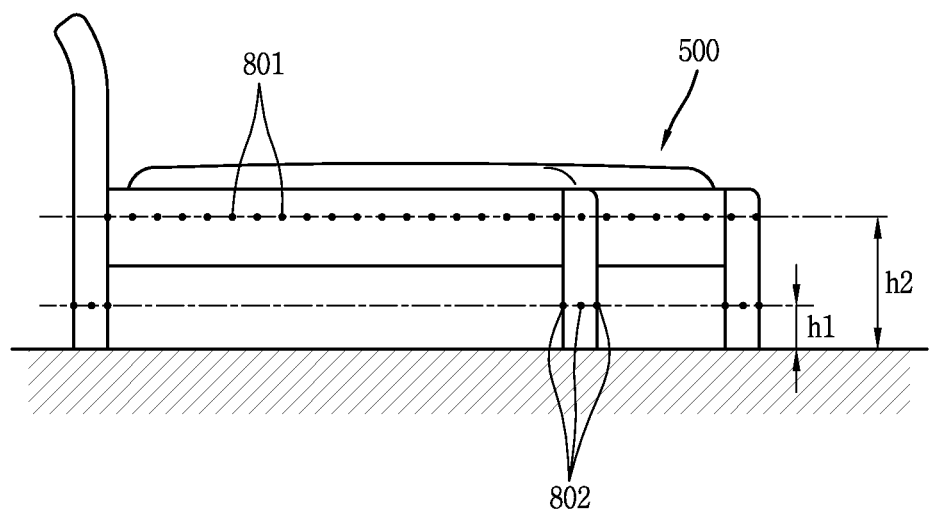
FIG. 8 is a conceptual view showing a method of sampling 3D coordinates information in a robot cleaner according to the present disclosure.

Referring to FIG. 8, the controller 1800 may extract 3D coordinates information 802 corresponding to a first height (h1), and 3D coordinates information 801 corresponding to a second height (h2), among 3D coordinates information generated by the 3D camera. That is, the controller 1800 may sample a part of the 3D coordinates information based on the first height (h1) and the second height (h2), thereby reducing a computation amount required to perform a driving method using 3D coordinates information.

The first height and the second height may be set to be different from each other. In an embodiment, the first height may be set to be lower than the second height. In another embodiment, the first height may be set to be lower than a height of the cleaner body of the robot cleaner 100, and the second height may be set to be higher than the height of the cleaner body of the robot cleaner 100.

As shown in FIG. 7C, the controller 1800 may determine a driving method corresponding to the obstacle 500, by using the first map 710 and the second map 720. More specifically, the controller 1800 may determine whether the cleaner body of the robot cleaner 100 can pass through the obstacle 500 or not, by using the first map 710. If it is determined that the cleaner body can pass through the obstacle 500, the controller 1800 may maintain the driving path (D1).

On the other hand, if it is determined that the cleaner body cannot pass through the obstacle 500, the controller 1800 may change the driving path (D1). That is, the controller 1800 may perform a driving with avoiding the obstacle 500, based on obstacle information included in the first map 710.

In an embodiment, the controller 1800 may determine whether the cleaner body of the robot cleaner 100 can pass through the obstacle 500 or not, by using the second map 720. And the controller 1800 may compare a determination result based on the second map 720, with a determination result based on the first map 710. For instance, the controller 1800 may determine whether the cleaner body can pass through a first obstacle displayed on the first map 710, and a second obstacle displayed on the second map 720, respectively.

In this case, if it is determined that the cleaner body can pass through both of the first obstacle and the second obstacle, the controller 1800 may maintain the driving path without changing the driving path. Even if it is determined that the cleaner body cannot pass through the second obstacle, if it is determined that the cleaner body can pass through the first obstacle, the controller 1800 may maintain the driving path without changing the driving path. If it is determined that the cleaner body cannot pass through both of the first obstacle and the second obstacle, the controller 1800 may change the driving path such that the cleaner body may avoid the first and second obstacles.

As shown in FIGS. 7A and 7B, a determination result based on the second map 720 and a determination result based on the first map 710 may be different from each other. In this case, the controller 1800 may increase the number of samples with respect to 3D coordinates information.

If the determination result based on the second map 720 and the determination result based on the first map 710 are different from each other, the controller 1800 may generate a third map (not shown) corresponding to a third height. The third height may be higher than the first height, but may be lower than the second height. Preferably, the third height may be lower than the height of the cleaner body.

If the cleaner body is spaced apart from an obstacle by more than a predetermined distance, the controller 1800 may reduce the increased number of samples. That is, if the cleaner body is spaced apart from an obstacle by more than a predetermined distance, the controller 1800 may control a driving of the cleaner body, based on coordinates information corresponding to the first height and coordinates information corresponding to the second height, among 3D coordinates information.

As shown in FIG. 7C, if the obstacle 500 shown in FIG. 5 exists on the driving path (D1) of the robot cleaner 100 according to the present disclosure, the controller 1800 may determine that the cleaner body can pass through the obstacle 500, based on the first map 710 corresponding to the first height.

Figure 9:
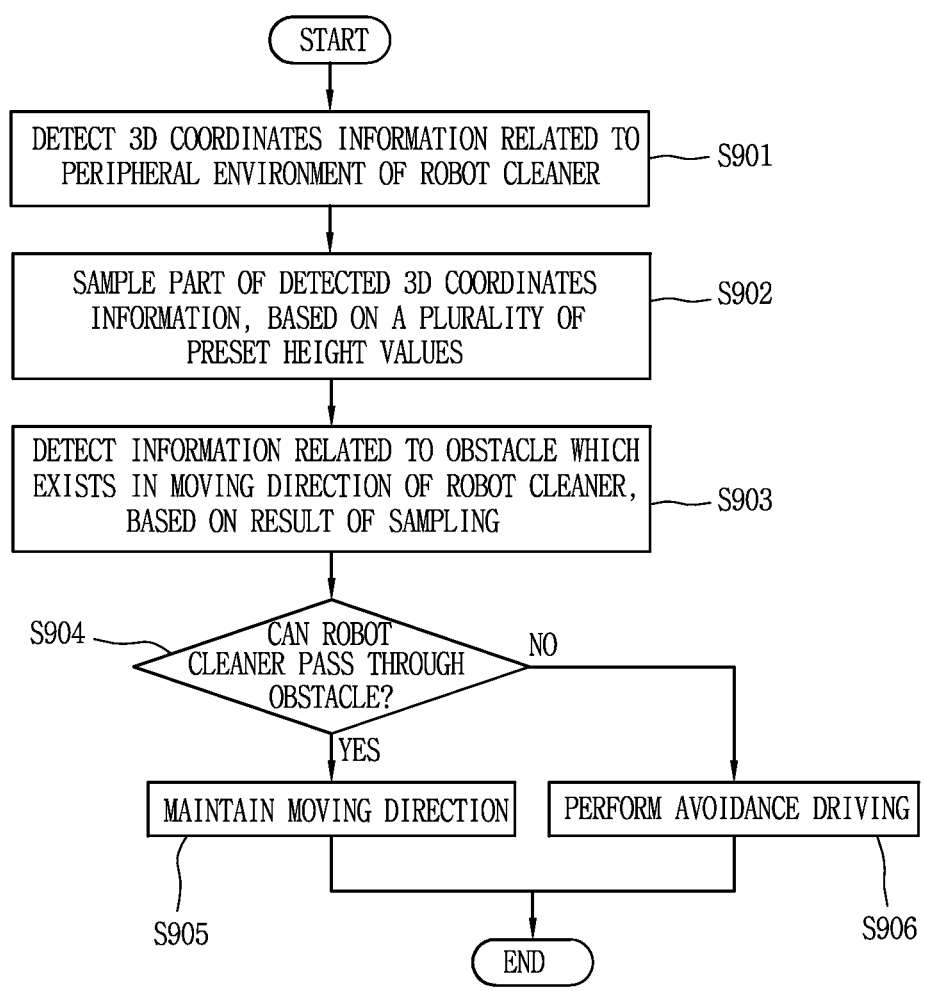
FIG. 9 is a flowchart showing an embodiment related to a method of controlling a robot cleaner according to the present disclosure.

FIG. 9 shows an embodiment related a method of controlling the robot cleaner according to the present disclosure. The 3D camera of the robot cleaner 100 may detect 3D coordinates information related to a surrounding environment (S901). The controller 1800 may sample a part of the detected 3D coordinates information, based on a plurality of preset heights (S902). More specifically, the controller 1800 may sample a part of the detected 3D coordinates information detected by the 3D camera, the part corresponding to a plurality of heights. Here, the height is defined by a floor surface where the robot cleaner 100 is positioned.

In an embodiment, the controller 1800 may generate a first map based on coordinates information corresponding to a first height among detected 3D coordinates information. And the controller 1800 may generate a second map based on coordinates information corresponding to a second height among the detected 3D coordinates information. That is, the controller 1800 may sample 3D coordinates information detected based on a plurality of heights, thereby generating a 2D map formed according to altitudes corresponding to the plurality of heights.

In another embodiment, the controller 1800 may set a plurality of heights in order to determine a reference of a sampling process with respect to 3D coordinates information. The controller 1800 may increase or decrease the number of samplings with respect to 3D coordinates information, according to an operation state of the robot cleaner 100. That is, the controller 1800 may increase or decrease the number of height values according to an operation state of the robot cleaner 100. And the controller 1800 may change a preset height according to an operation state of the robot cleaner 100.

The controller 1800 may detect information related to an obstacle positioned in a moving direction of the robot cleaner, based on a sampling result (S903). More specifically, the controller 1800 may generate maps according to a plurality of altitudes (or heights) based on a sampling result, and may compare the maps with each other to thus detect information related to an obstacle positioned in a moving direction of the robot cleaner. The controller 1800 may detect the information related to the obstacle, with respect to each of the maps, according to a plurality of altitudes.

In an embodiment, the controller 1800 may detect information related to a shape of an obstacle positioned on a driving path of the cleaner body, based on sampled coordinates information. The controller 1800 may determine whether there is a space below the obstacle, based on the detected shape of the obstacle. If it is determined that there is a space below the obstacle, the controller 1800 may determine whether the cleaner body can pass through the space. Further, the controller 1800 may control the driving unit based on a result of the determination whether the cleaner body can pass through the space.

The controller 1800 may determine whether the cleaner body can pass through the obstacle, based on information related to the obstacle (S904). Especially, the controller

1800 may determine whether the cleaner body can pass through the obstacle, with respect to maps according to a plurality of altitudes.

For instance, the controller 1800 may determine whether the cleaner body can pass through an obstacle, based on an obstacle information included in a first map corresponding to a first height. And the controller 1800 may determine whether the cleaner body can pass through an obstacle, based on obstacle information included in a second map corresponding to a second height. Accordingly, the obstacle determination result based on the first map, and the obstacle determination result based on the second map may be different from each other.

If it is determined that the cleaner body can pass through an obstacle, the controller 1800 may control the driving unit to maintain a moving direction of the robot cleaner (S905). If it is determined that the cleaner body cannot pass through an obstacle, the controller 1800 may change the moving direction of the robot cleaner such that the robot cleaner may avoid the obstacle (S906).

In an embodiment, the controller 1800 may detect information related to a shape of an object positioned on a driving path of the cleaner body, based on sampled coordinates information, and may control the driving unit to change a driving path based on the detected shape. If it is determined, based on the detected shape, that there is a space below the object, the controller may determine whether the cleaner body can pass through the space. And the controller may control the driving unit based on a result of the determination.

Figure 10:
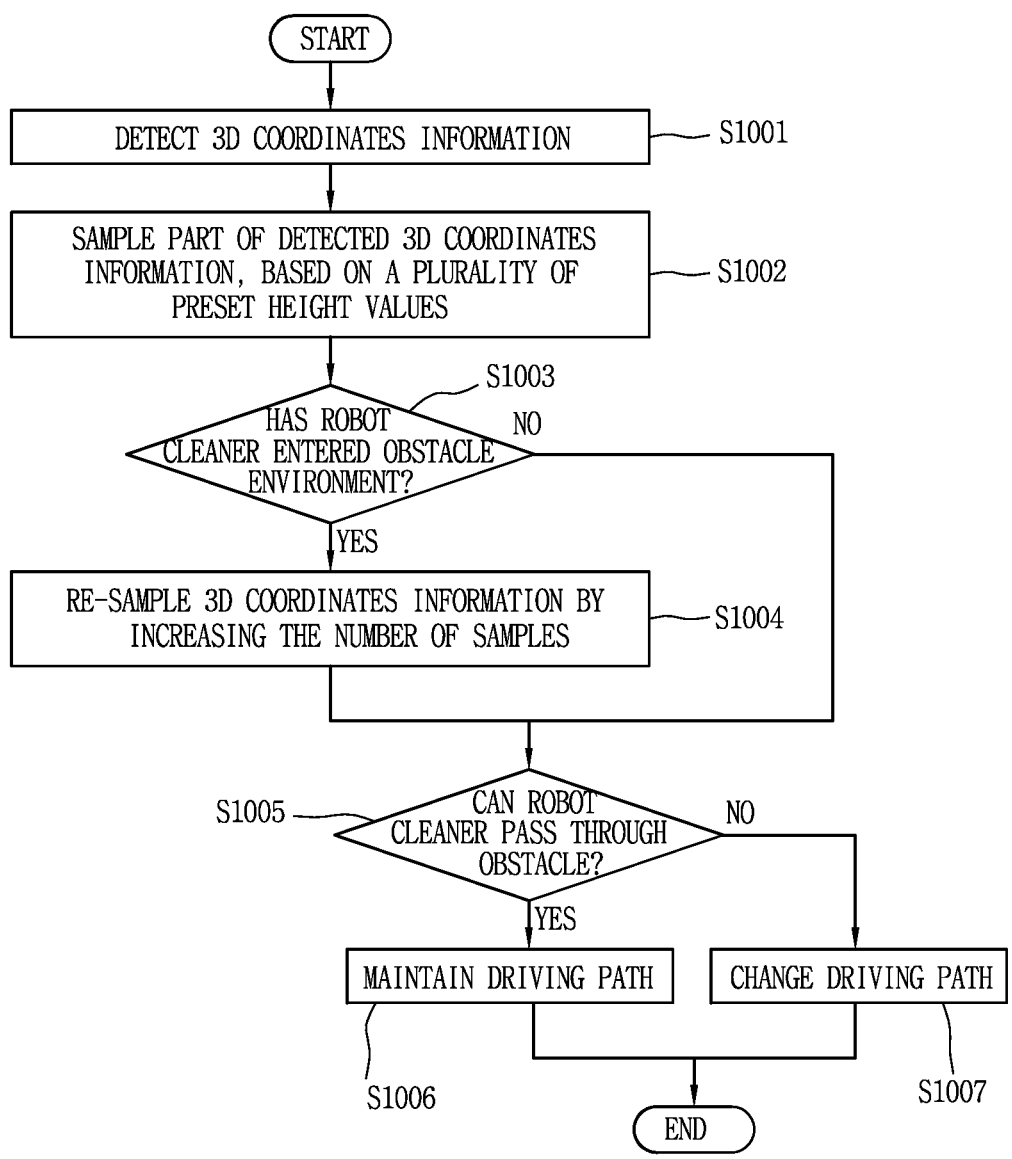
FIG. 10 is a flowchart showing an embodiment related to a method of controlling a robot cleaner according to the present disclosure.

FIG. 10 shows an embodiment related to a method of controlling the robot cleaner according to the present disclosure. The 3D camera of the robot cleaner 100 may detect 3D coordinates information related to a surrounding environment (S1001). The controller 1800 may sample a part of the detected 3D coordinates information based on a plurality of preset height values (S1002). The controller 1800 may determine whether the robot cleaner has entered an obstacle environment (S1003). More specifically, the controller 1800 may determine whether the robot cleaner has entered an obstacle environment, based on an operation state of the driving unit 1300.

For instance, the controller 1800 may determine that the robot cleaner has entered an obstacle environment, if the wheels of the driving unit 1300 are idling or if the wheels are in a restricted state. That is, the controller 1800 may determine whether the wheels are in a restricted state or are idling, by using an encoder which senses an operation state of the wheels.

In another embodiment, the controller 1800 may determine that the robot cleaner has entered an obstacle environment if a distance between an obstacle and the cleaner body is less than a predetermined distance. That is, the controller 1800 may periodically determine a distance between an obstacle and the cleaner body, by using at least one of an ultrasonic sensor, an optical sensor and a camera sensor. If the distance between the obstacle and the cleaner body is less than a predetermined distance, the controller 1800 may determine that the robot cleaner has entered an obstacle environment.

If it is determined that the robot cleaner has entered an obstacle environment, the controller 1800 may increase the number of samples with respect to 3D coordinates information, and may re-sample the 3D coordinates information (S1004).

The controller 1800 may determine whether the cleaner body can pass through an obstacle or not, based on a result of a final sampling process (S1005). If it is determined that the cleaner body can pass through an obstacle, the controller 1800 may control the driving unit to maintain a moving direction of the robot cleaner (S1006). On the other hand, if it is determined that the cleaner body cannot pass through an obstacle, the controller 1800 may change the moving direction of the robot cleaner such that the robot cleaner may avoid the obstacle (S1007).

Figure 11A:
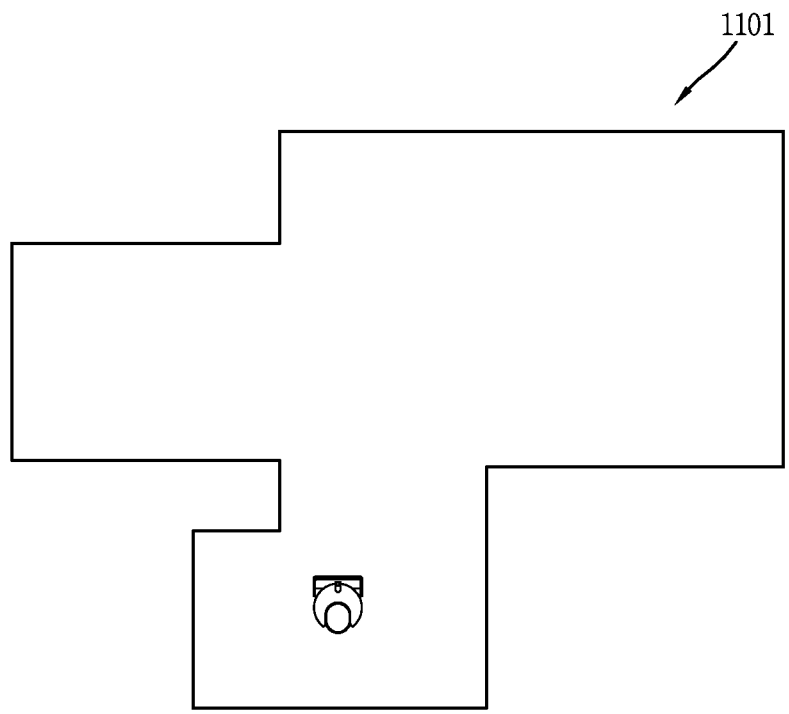
FIGS. 11A and 11B are conceptual views each showing a cleaning map generated from a robot cleaner according to the present disclosure.
Figure 11B:
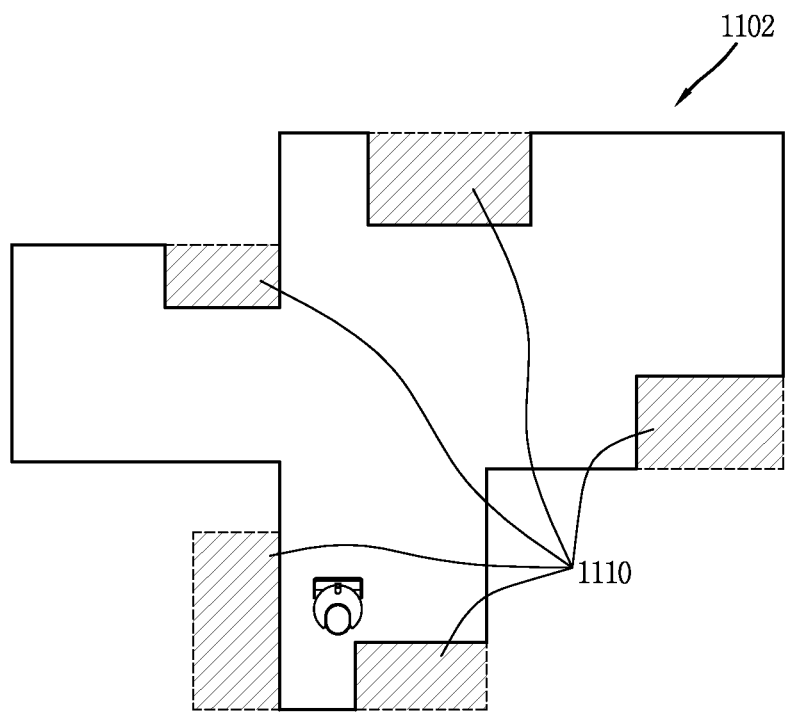

FIGS. 11A and 11B show cleaning maps generated by the robot cleaner according to the present disclosure. The controller 1800 may control the driving unit 1300 such that the robot cleaner may move along a wall formed on an outer periphery of a cleaning region, in order to generate a map of the cleaning region. While the cleaner body moves along the wall, the controller 1800 may generate a second map and a third map, based on coordinates information corresponding to a second height and a third height, among 3D coordinates information detected by the 3D camera.

That is, while the robot cleaner moves along the wall, the controller 1800 may sample coordinates information corresponding to a second height and a third height, among 3D coordinates information. For instance, the third height may be set to be different from the first height. Especially, the third height may be set to be higher than the first height and the second height.

FIGS. 11A and 11B show a second map 1101 and a third map 1102. Referring to FIGS. 11A and 11B, the controller 1800 may compare the second map 1101 and the third map 1102 with each other, and may recognize a difference 1110 of a cleaning region according to an altitude as a result of the comparison. And the controller 1800 may estimate a current position of the robot cleaner, based on the difference 1110 of the cleaning region according to an altitude.

Figure 12:
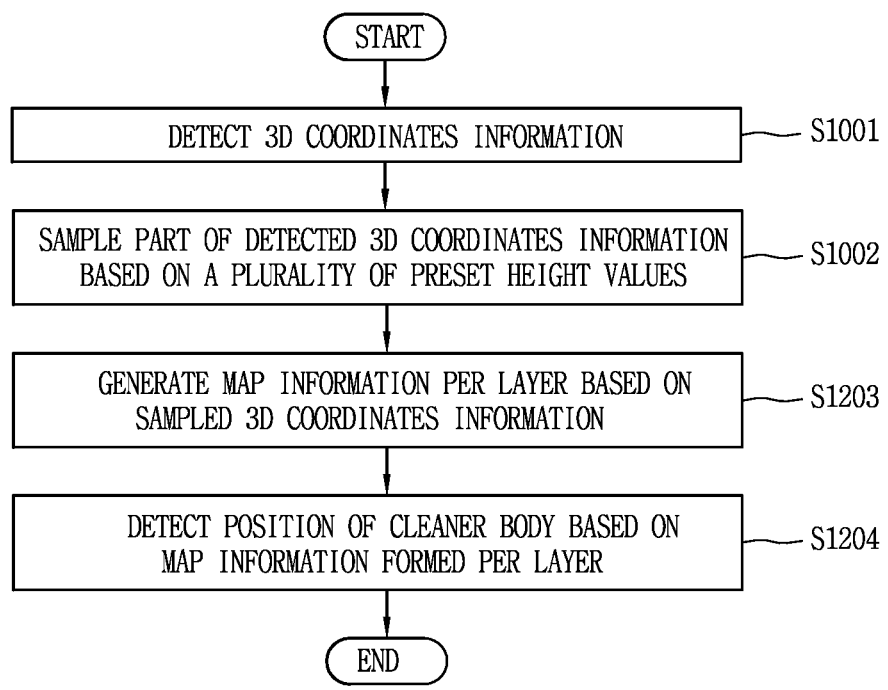
FIG. 12 is a flowchart showing an embodiment related to a method of controlling a robot cleaner according to the present disclosure.

FIG. 12 shows a method of using the maps according to altitudes shown in FIGS. 11A and 11B, by the robot cleaner. The 3D camera of the robot cleaner 100 may detect 3D coordinates information related to a surrounding environment (S1201).

The controller 1800 may sample a part of the detected 3D coordinates information based on a plurality of preset height values (S1202). In a case where the robot cleaner moves along an outer periphery or a wall surface of a cleaning region, the controller 1800 may sample coordinates information corresponding to a second height and a third height, among 3D coordinates information. For instance, the second height may be set as 30 cm, and the third height may be set as 1 m.

The controller 1800 may generate map information formed as a plurality of layers, based on sampled 3D coordinates information (S1203). The controller 1800 may change the number of layers according to a performance of the robot cleaner. That is, the controller 1800 may increase the number of samples of 3D coordinates information, as an information processing speed of the robot cleaner is high. Further, the controller 1800 may detect a position of the cleaner body based on the map information formed per layer (S1204). Further, the controller 1800 may set a driving path of the robot cleaner based on the map information formed per layer.

In the present disclosure, even if the robot cleaner which performs an autonomous driving enters an obstacle environment having various conditions, a shape of the obstacle environment may be detected based on a sampling result with respect to 3D coordinates information. This may allow the robot cleaner to set a driving path suitable for the detected obstacle environment. That is, in the present disclosure, as the robot cleaner which performs an autonomous driving acquires a lattice map formed per layer, a position of the cleaner body may be detected more precisely.

Further, in the present disclosure, 3D coordinates information may be rapidly processed while the controller of the robot cleaner which performs an autonomous driving maintains its performance. This may prevent an increase of fabrication costs. Further, in the present disclosure, since the robot cleaner which performs autonomous driving sets a driving path suitable for an obstacle environment, unnecessary power consumption may be prevented. This may allow the robot cleaner to have increased power efficiency.

Therefore, an aspect of the present disclosure provides a robot cleaner (a moving robot) which performs an autonomous driving, capable of recognizing its position or performing a driving while avoiding an obstacle, by using a 3D camera sensor which acquires 3D coordinates information related to a feature terrain or an obstacle positioned near the robot cleaner, and a method for controlling the same.

Another aspect of the present disclosure provides a robot cleaner which performs an autonomous driving, capable of immediately reacting with an obstacle by reducing a computation amount, in a process of detecting information related to an obstacle which exists on a driving path, based on 3D coordinates information acquired by a 3D camera sensor, and a method for controlling the same.

Another aspect of the present disclosure provides a robot cleaner which performs an autonomous driving, capable of sampling coordinates information corresponding to a plurality of layers, among 3D coordinates information acquired by a 3D camera sensor, and a method for controlling the same.

Another aspect of the present disclosure provides a robot cleaner which performs an autonomous driving, capable of precisely sensing a position of a cleaner body, by sampling coordinates information corresponding to a plurality of layers, among 3D coordinates information acquired by a 3D camera sensor, and a method for controlling the same.

Another object of the present disclosure is to provide a robot cleaner which performs an autonomous driving, capable of precisely detecting obstacle-related information, even if a time of a 3D camera sensor is changed, and a method for controlling the same.

To achieve these and other aspects and in accordance with the purpose of the present disclosure, as embodied and broadly described herein, there is provided a cleaner which performs an autonomous driving, comprising: a cleaner body; a driving unit configured to move the cleaner body; a camera configured to detect 3D coordinates information; and a controller configured to sample a part of detected 3D coordinates information based on at least one preset height, and configured to control the driving unit based on the sampled coordinates information.

In an embodiment, the controller detects information related to a shape of an object which exists on a driving path of the cleaner body, based on the sampled coordinates information. And the controller controls the driving unit to change the driving path, based on the detected shape. In an embodiment, if it is determined that there is a space below the object, based on information related to the detected shape, the controller determines whether the cleaner body can pass through the space, and controls the driving unit based on a result of the determination.

In an embodiment, the controller extracts coordinates information corresponding to a first height, and coordinates information corresponding to a second height, from the detected 3D coordinates information. And the controller compares the coordinates information corresponding to the first height, with the coordinates information corresponding to the second height, thereby determining whether there is a space below the object. In an embodiment, the first height is set to be lower than a height of the cleaner body, and the second height is set to be higher than the height of the cleaner body.

In an embodiment, the controller generates one or more lattice maps corresponding to one or more heights, based on the sampled 3D coordinates information. In an embodiment, the controller sets a driving path based on the generated one or more lattice maps. In an embodiment, the controller detects information related to a position of the cleaner body, based on the lattice map.

In an embodiment, the cleaner which performs an autonomous driving further comprises an encoder configured to sense information related to an operation of the driving unit. The controller detects whether wheels of the driving unit are idling or not by using the encoder, and increases the number of samples with respect to the detected 3D coordinates information.

In an embodiment, the controller determines whether the wheels of the driving unit are in a restricted state, and increases the number of samples with respect to the detected 3D coordinates information, if the wheels of the driving unit are in a restricted state.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cleaner which performs an autonomous driving, comprising:
   a cleaner body;
   a motor configured to move the cleaner body;
   a sensor configured to detect three-dimensional (3D) coordinate information about a region; and
   a controller configured to:
      sample a portion of the detected 3D coordinate information, wherein the sampled 3D coordinate information is associated with coordinates located at a plurality of prescribed heights in the region, and
      control the motor based on the sampled 3D coordinate information,
   wherein the controller variably sets a size of the sampled 3D coordinate information and the plurality of prescribed heights of the sampled 3D coordinate information, and generates a map formed of a plurality of layers corresponding to the plurality of prescribed heights using the sampled 3D coordinate information.

2. The cleaner of claim 1, wherein the controller, when controlling the motor, detects a shape of an object in a driving path of the cleaner body, based on the sampled 3D coordinate information, and changes a driving path of the cleaner based on the detected shape.

3. The cleaner of claim 2, wherein the controller, when detecting the shape of the object in the driving path, detects, based on the sampled 3D coordinate information, a space below the object, determines whether the cleaner body can pass through the space, and controls the motor based on whether the cleaner body can pass through the space.

4. The cleaner of claim 3, wherein the plurality of prescribed heights include a first height and a second height that are different,
wherein the controller, when sampling the portion of the detected 3D coordinate information, extracts first coordinate information corresponding to the first height and second coordinate information corresponding to the second height, from the detected 3D coordinate information, and
wherein the controller, when detecting the space below the object, compares the first coordinate information corresponding to the first height with the second coordinate information corresponding to the second height.

5. The cleaner of claim 4, wherein the first height is lower than a height of an upper portion the cleaner body, and
wherein the second height is higher than the height of the upper portion the cleaner body.

6. The cleaner of claim 1, wherein the controller generates one or more maps corresponding, respectively, to one or more heights, based on the sampled 3D coordinate information, the one or more maps identifying locations of objects at the one or more heights.

7. The cleaner of claim 6, wherein the controller, when controlling the motor, sets a driving path based on the generated one or more maps.

8. The cleaner of claim 7, wherein the controller detects a position of the cleaner body based on the one or more maps.

9. The cleaner of claim 1, wherein the controller senses whether the motor is idling, and increases an amount of the detected 3D coordinate information included in the sampled portion of the detected 3D coordinate information when the drive motor is idling.

10. The cleaner of claim 1, wherein the controller determines whether the controller has entered an environment with an obstacle, and increases an amount of the detected 3D coordinate information included in the sampled portion of the detected 3D coordinate information when the controller has entered the environment with the obstacle.

11. A cleaner which performs an autonomous driving, comprising:
a cleaner body;
a motor configured to move the cleaner body;
a sensor configured to detect three-dimensional (3D) coordinate information about a region; and
a controller configured to:
sample a first portion of the detected 3D coordinate information, wherein the first portion of the 3D coordinate information is associated with at least one of a plurality of prescribed heights,
control the motor based on the first portion of the 3D coordinate information to move the cleaner in a first driving path,
determine when an object is present in the first driving path,
sample a second portion of the detected 3D coordinate information when the object is present in the region, wherein the second portion of the detected 3D coordinate information includes more of the detected 3D coordinate information than the first portion of the 3D coordinate information, and
control the motor based on the second portion of the 3D coordinate information to move the cleaner in a second driving path,
wherein the controller is further configured to variably set sizes of the sampled first and second portions of the 3D coordinate information and the prescribed heights, and generate a map formed of a plurality of layers corresponding to the prescribed heights using the sampled 3D coordinate information.

12. The cleaner of claim 11, wherein the controller detects a shape of the object based on the second portion of the 3D coordinate information, and determines the second driving path based on the detected shape.

13. The cleaner of claim 12, wherein the controller, when detecting the shape of the object, detects a space below the object based on the sampled 3D coordinate information, determines whether the cleaner body can pass through the space, and controls the motor based on whether the cleaner body can pass through the space.

14. The cleaner of claim 13, wherein the prescribed heights include a first height lower than a height of an upper portion the cleaner body and a second height higher than the height of the upper portion the cleaner body,
wherein the controller extracts first coordinate information corresponding to the first height and second coordinate information corresponding to the second height, from the detected 3D coordinate information, and
wherein the controller, when detecting the space below the object, compares the first coordinate information corresponding to the first height with the second coordinate information corresponding to the second height.

15. The cleaner of claim 11, wherein the sensor includes one or more of external signal sensor, a front side sensor, a cliff sensor, a lower camera sensor, an upper camera sensor, or a three-dimensional camera sensor.

16. The cleaner of claim 11, wherein the controller determines that the object is present in the first driving path when the motor is idling, when a wheel included in the cleaner is in a restricted state, or the object is located less than a threshold distance from the cleaner.

17. A cleaner which performs an autonomous driving, comprising:
a cleaner body;
a motor configured to move the cleaner body within a region;
a sensor configured to detect three-dimensional (3D) coordinate information about the region; and
a controller configured to:
sample a portion of the 3D coordinate information, the sampled portion of the detected 3D coordinate information being associated with a plurality of heights,
generate maps of the region at, respectively, the plurality of heights, and
control the motor based on the maps,
wherein the controller is further configured to:
variably set a size of the sampled portion of the 3D coordinate information and the plurality of prescribed heights, and generate a map formed of a plurality of layers corresponding to the plurality of prescribed heights using the sampled portion of the 3D coordinate information.

18. The cleaner of claim 17, wherein the controller, when controlling the motor, sets a driving path based on the generated maps.

19. The cleaner of claim 17, wherein the controller detects a position of the cleaner body within the region based on the maps.

20. The cleaner of claim 17, wherein the maps includes a first map associated with a first height below an upper portion of the cleaner, and a second map associated with a second height above the upper portion of the cleaner, and wherein the controller identifies a space under an object based on a difference between first map and the second map.

* * * * *